United States Patent [19]
Oyler et al.

[11] Patent Number: 6,161,779
[45] Date of Patent: Dec. 19, 2000

[54] LAWN FERTILIZING APPARATUS HAVING A DETACHABLE BODY WHICH HAS TWO SEPARATE WATER OUTLETS DEFINED THEREIN

[75] Inventors: Thomas C. Oyler, Louisville, Ky.; Douglas J. Burnworth, Confluence, Pa.

[73] Assignee: Gilmour, Inc., Somerset, Pa.

[21] Appl. No.: 09/322,654

[22] Filed: May 28, 1999

[51] Int. Cl.⁷ ........................................ B05B 7/26
[52] U.S. Cl. .................... 239/310; 239/317; 239/316; 239/318; 239/273; 239/390; 239/442; 137/268
[58] Field of Search .................... 239/273, 279, 239/310, 317, 312, 316, 318, 390, 436, 442; 137/268

[56] References Cited

U.S. PATENT DOCUMENTS

| | | |
|---|---|---|
| 1,168,219 | 1/1916 | Miller ........................................ 239/436 |
| 2,711,928 | 6/1955 | Randa ................................. 137/268 X |
| 3,060,956 | 10/1962 | Menzie ................................ 239/310 X |
| 3,861,418 | 1/1975 | Dujardyn ............................ 137/268 X |
| 3,933,308 | 1/1976 | Bradley et al. . |
| 3,940,069 | 2/1976 | Gunzel, Jr. et al. .................... 239/436 |
| 4,333,493 | 6/1982 | Beiswenger et al. . |
| 4,340,179 | 7/1982 | Knapp . |
| 5,096,123 | 3/1992 | Petitgoue . |
| 5,150,840 | 9/1992 | Brynkiewicz . |
| 5,413,280 | 5/1995 | Taylor . |
| 5,549,248 | 8/1996 | Baker et al. . |
| 5,660,330 | 8/1997 | Scott . |
| 5,771,930 | 6/1998 | Visk ..................................... 137/268 X |
| 5,775,593 | 7/1998 | Delorme et al. . |

*Primary Examiner*—Andres Kashinkow
*Assistant Examiner*—Robin O. Evans
*Attorney, Agent, or Firm*—Maginot, Addison & Moore

[57] ABSTRACT

An apparatus for dissolving and dispensing liquid dissolvable material includes a container having a mixing chamber defined therein. The apparatus also includes a body removably secured to an upper portion of the container. The body has a fluid inlet, a first fluid outlet, a second fluid outlet, and a central passage defined therein. The central passage is in fluid communication with each of the fluid inlet, the first fluid outlet, and the second fluid outlet. The central passage is also in fluid communication with the mixing chamber such that each of the fluid inlet, the first fluid outlet, and the second fluid outlet is in fluid communication with the mixing chamber. Moreover, the apparatus includes a cap secured to the first fluid outlet of the body so as to prevent fluid from advancing through the first fluid outlet. Yet further, the apparatus includes a sprinkler assembly secured to the second fluid outlet of the body. Fluid is advanced from the mixing chamber via a first fluid path which includes the central passage, the second fluid outlet, and the sprinkler assembly.

27 Claims, 4 Drawing Sheets

LAWN FERTILIZING APPARATUS HAVING A DETACHABLE BODY WHICH HAS TWO SEPARATE WATER OUTLETS DEFINED THEREIN

TECHNICAL FIELD OF THE INVENTION

The present invention relates generally to a lawn fertilizing apparatus, and more particularly to a lawn fertilizing apparatus having a detachable body which has two separate water outlets defined therein.

BACKGROUND OF THE INVENTION

Currently, there exists a number of different procedures for applying chemicals such as fertilizers to a residential lawn or the like. One such procedure is to place a quantity of solid fertilizer granules in a wheeled spreader which is then pushed by an operator around the lawn thereby causing the fertilizer granules to be spread onto the lawn. However, such spreaders are typically expensive and may require a relatively large amount of time and physical exertion in order to push the spreader around the entire lawn. In addition, such spreaders often contain a large number of metal components which are particularly susceptible to corrosion and the like caused by the chemicals included in the fertilizer.

Another procedure which is commonly utilized to apply fertilizers is the procurement of a service company which is hired by the homeowner to dispense chemicals onto the homeowner's lawn. However, use of such service companies is relatively expensive and is often available only in urban areas.

Due to the drawbacks associated with the above-described procedures, lawn fertilizing apparatuses have heretofore been designed which apply chemicals through a rotary sprinkler or the like. In such a fertilizing apparatus, solid or liquid fertilizer is first placed in a tank which is then filled with water from a garden hose coupled to the tank. Thereafter, water, with the fertilizer dissolved therein, is sprayed on the lawn by use of a sprinkler assembly which is either coupled to the tank directly or indirectly coupled to the tank via a garden hose.

One such lawn fertilizing apparatus is disclosed in U.S. Pat. No. 3,933,308 issued to Bradley et al ("Bradley"). The fertilizing apparatus described in Bradley has a spherically-shaped container for mixing fertilizer or the like with water which is then sprayed on a lawn by use of a sprinkler assembly coupled to the container. However, the design of the Bradley fertilizing apparatus has a number of drawbacks associated therewith. For example, the water inlet is defined in a lower portion of the container. Hence, if a user decouples the water supply hose from the water inlet, any residual concentrated chemicals in the container will spill out the water inlet thereby potentially causing injury to the user or damage to the lawn.

Moreover, the water inlet, the outlet, and the filler cap fitting of the Bradley fertilizing apparatus are molded or otherwise defined in the container itself thereby increasing costs associated with manufacturing the fertilizing apparatus. In particular, the molding process necessary to mold the container is rendered relatively complex since the water inlet, the outlet, and the filler cap fitting are each molded into the container. Moreover, if the threads associated with water inlet, the outlet, or the filler cap fitting become stripped, it is generally necessary to replace the entire apparatus.

What is needed therefore is a lawn fertilizing apparatus which overcomes one or more of the above-mentioned drawbacks. What is particularly needed is a lawn fertilizing apparatus which can be quickly and easily coupled to and decoupled from a garden hose without spilling any residual chemicals remaining in the apparatus. What is also needed is a lawn fertilizing apparatus which provides enhanced ease of manufacturing relative to lawn fertilizing apparatuses which have heretofore been designed.

SUMMARY OF THE INVENTION

In accordance with a first embodiment of the present invention, there is provided an apparatus for dissolving and dispensing liquid dissolvable material. The apparatus includes a container having a mixing chamber defined therein. The apparatus also includes a body removably secured to the container. The body has a fluid inlet, a first fluid outlet, a second fluid outlet, and a central passage defined therein. The central passage is in fluid communication with each of the fluid inlet, the first fluid outlet, and the second fluid outlet. The central passage is also in fluid communication with the mixing chamber such that each of the fluid inlet, the first fluid outlet, and the second fluid outlet is in fluid communication with the mixing chamber.

In accordance with a second embodiment of the present invention, there is provided an apparatus for dissolving and dispensing liquid dissolvable material. The apparatus includes a container having a mixing chamber defined therein. The apparatus also includes a body removably secured to an upper portion of the container. The body has a fluid inlet, a first fluid outlet, a second fluid outlet, and a central passage defined therein. The central passage is in fluid communication with each of the fluid inlet, the first fluid outlet, and the second fluid outlet. The central passage is also in fluid communication with the mixing chamber such that each of the fluid inlet, the first fluid outlet, and the second fluid outlet is in fluid communication with the mixing chamber. Moreover, the apparatus includes a cap secured to the first fluid outlet of the body so as to prevent fluid from advancing through the first fluid outlet. Yet further, the apparatus includes a sprinkler assembly secured to the second fluid outlet of the body. Fluid is advanced from the mixing chamber via a first fluid path which includes the central passage, the second fluid outlet, and the sprinkler assembly.

In accordance with a third embodiment of the present invention, there is provided an apparatus for dissolving and dispensing liquid dissolvable material. The apparatus includes a container having a mixing chamber defined therein. The apparatus also includes a body removably secured to an upper portion of the container. The body has a fluid inlet, a first fluid outlet, a second fluid outlet, and a central passage defined therein. The central passage is in fluid communication with each of the fluid inlet, the first fluid outlet, and the second fluid outlet. The central passage is also in fluid communication with the mixing chamber such that each of the fluid inlet, the first fluid outlet, and the second fluid outlet is in fluid communication with the mixing chamber. The apparatus further includes a cap secured to the second fluid outlet of the body so as to prevent fluid from advancing through the second fluid outlet. Moreover, the apparatus includes an outlet hose secured to the first fluid outlet of the body. Fluid is advanced from the mixing chamber via a first fluid path which includes the central passage, the first fluid outlet, and the outlet hose.

In accordance with a fourth embodiment of the present invention, there is provided fertilizer dispensing mechanism. The fertilizing dispensing mechanism includes a fertilizer container having a chamber defined therein and a first coupling. The fertilizing dispensing mechanism also includes a fluid directing body having a second coupling which cooperates with the first coupling so as to secure the fluid directing body to the fertilizer container. The body has a fluid inlet, a sprinkler fluid outlet, and a hose fluid outlet defined therein. The fertilizer dispensing mechanism is operable in a sprinkler supply mode and a hose supply mode. When the fertilizer dispensing mechanism is operating in the sprinkler supply mode, fluid entering the fluid inlet of the fluid directing body is directed (i) from the fluid inlet to the chamber of the fertilizer container, and then (ii) from the chamber to the sprinkler fluid outlet of the fluid directing body, and then (iii) out of the fluid directing body through the sprinkler fluid outlet. When the fertilizer dispensing mechanism is operating in the hose supply mode, fluid entering the fluid inlet of the fluid directing body is directed (i) from the fluid inlet to the chamber of the fertilizer container, and then (ii) from the chamber to the hose fluid outlet of the fluid directing body, and then (iii) out of the fluid directing body through the hose fluid outlet.

It is therefore an object of the present invention to provide a new and useful lawn fertilizing apparatus.

It is moreover an object of the present invention to provide an improved lawn fertilizing apparatus.

It is yet further an object of the present invention to provide a lawn fertilizer apparatus which may be utilized as either a lawn fertilizing sprinkler apparatus or an in-line feeder for supplying dissolved fertilizer to an external sprinkler.

It is yet another object of the invention to provide a lawn fertilizing apparatus which provides enhanced ease of manufacturing relative to lawn fertilizing apparatuses which have heretofore been designed.

In addition, it is yet another object of the present invention to provide a lawn fertilizing apparatus which can be quickly and easily coupled to and decoupled from a garden hose without spilling any residual chemicals remaining in the apparatus.

The above and other objects, features, and advantages of the present invention will become apparent from the following description and the attached drawings.

DETAILED DESCRIPTION OF THE INVENTION

Figure 1:
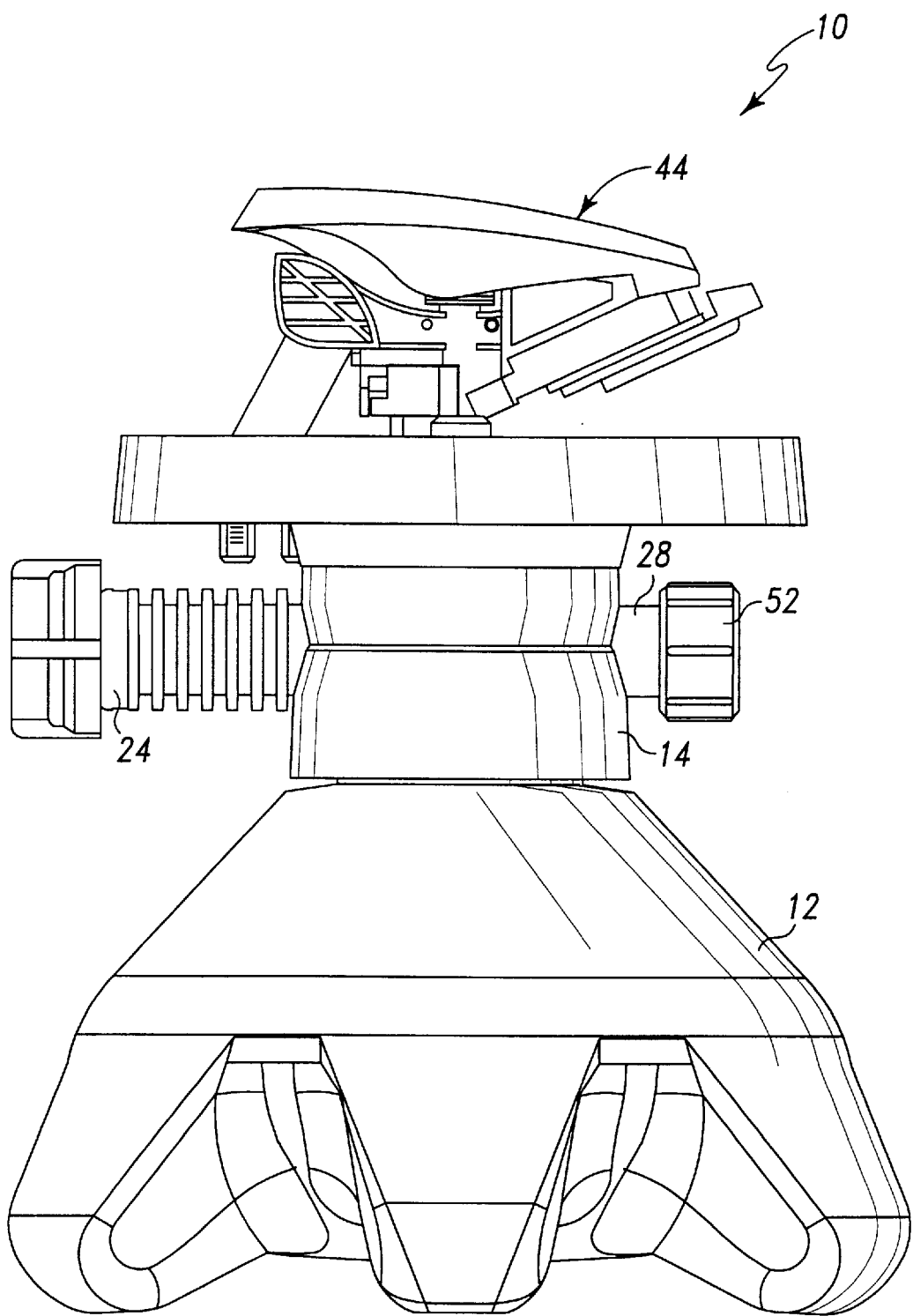
FIG. 1 is a side view of a lawn fertilizing apparatus which incorporates the features of the present invention therein, note that the sprinkler assembly is secured to the sprinkler outlet, whereas the hose outlet is capped.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Figure 2:
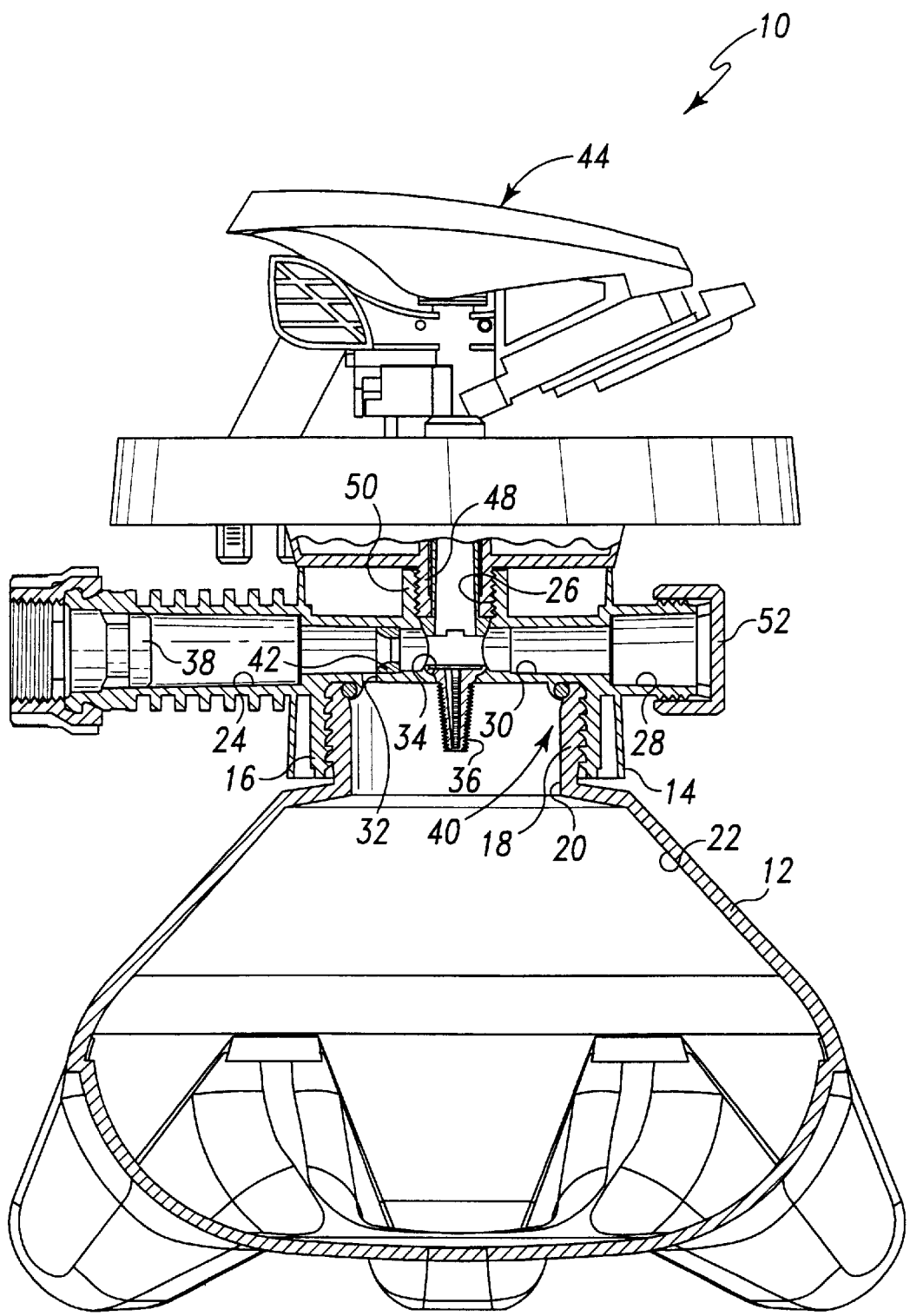
FIG. 2 is a partial cross-sectional view of FIG. 1, note that the anti-siphon assembly and a portion of the sprinkler assembly are not shown in cross-section for clarity of description.
Figure 3:
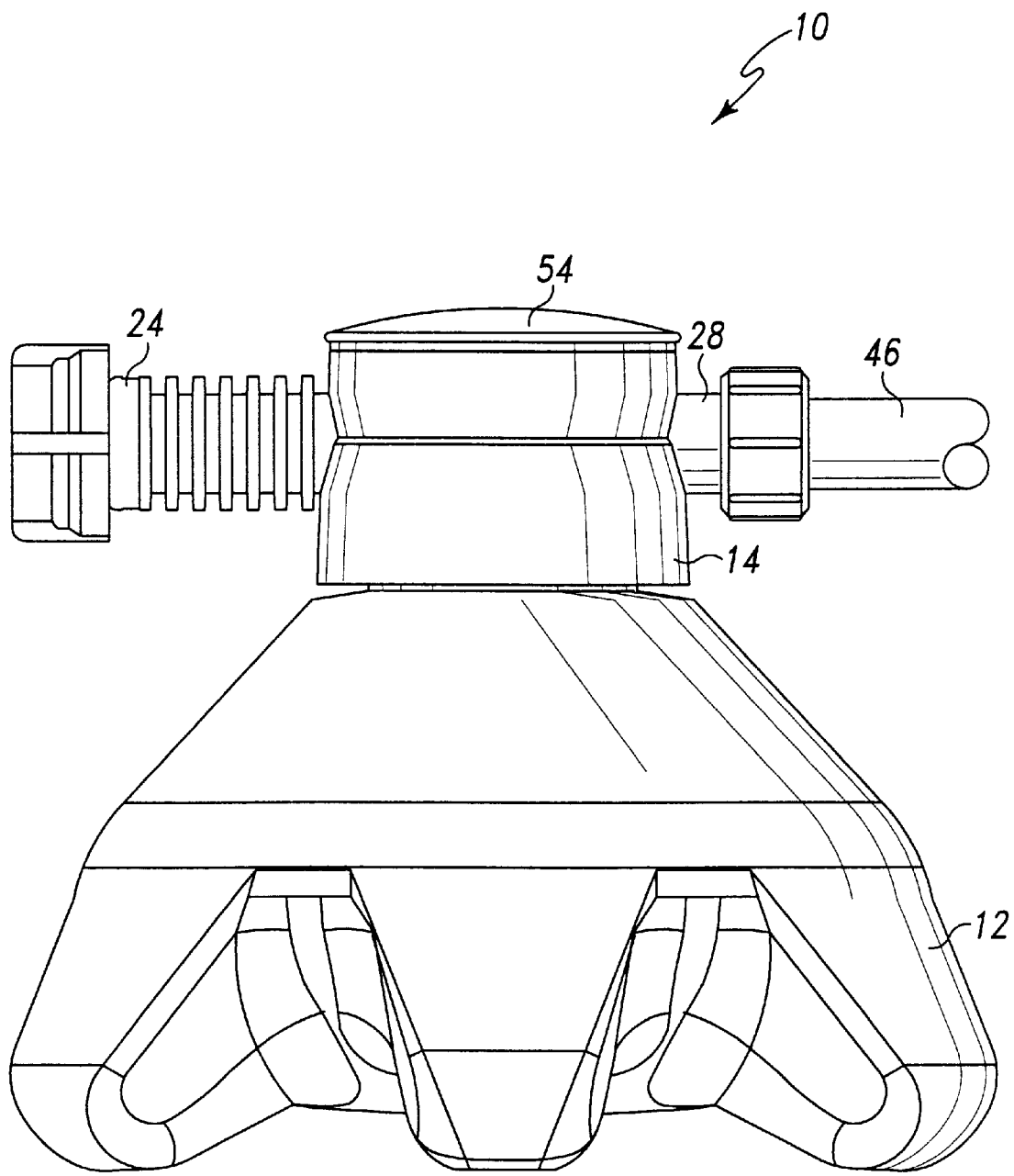
FIG. 3 is a view similar to FIG. 1, but showing a water hose coupled to the hose outlet, whereas the sprinkler outlet is capped.
Figure 4:
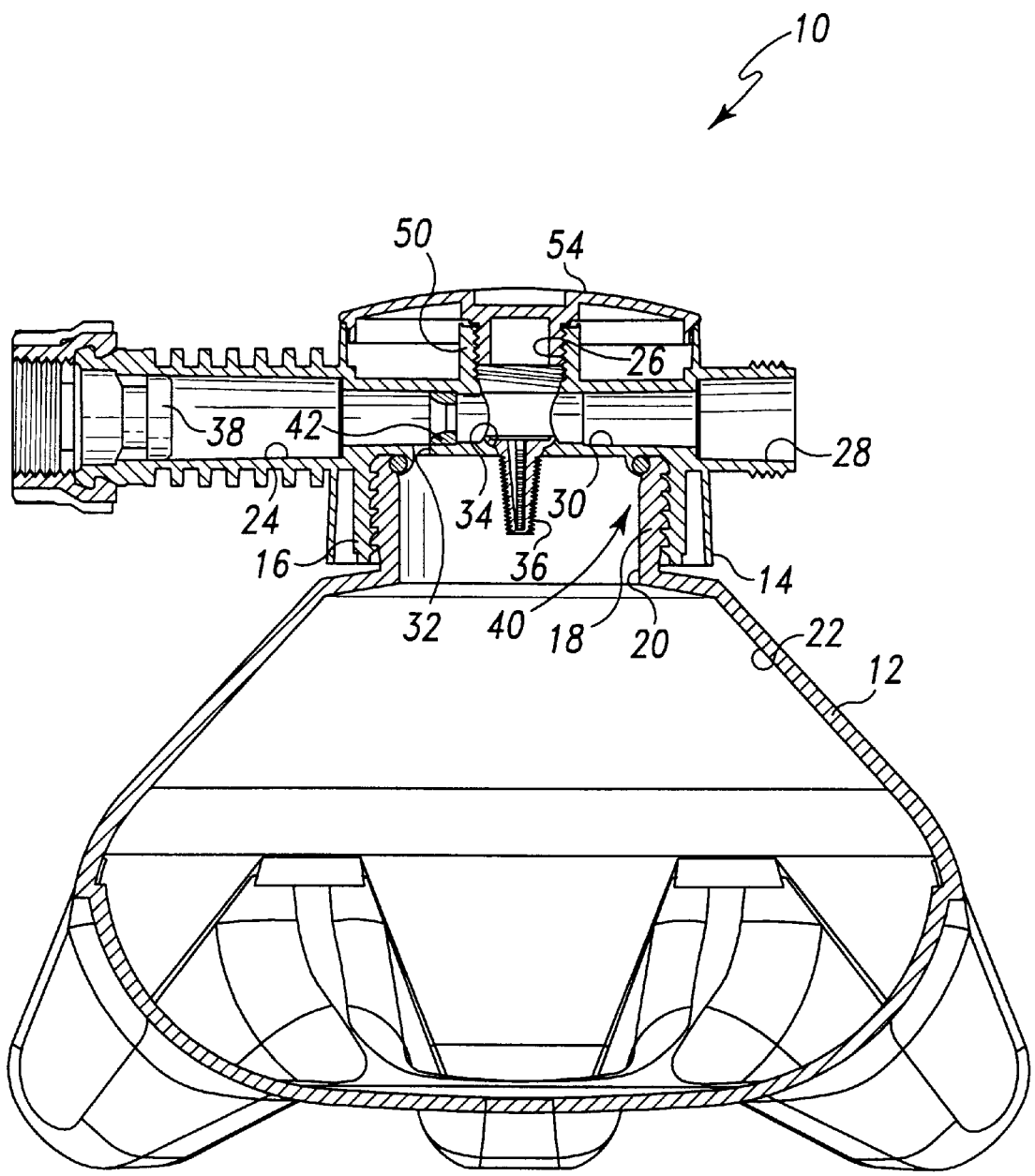
FIG. 4 is a cross-sectional view of FIG. 3, note that the anti-siphon assembly is not shown in cross-section for clarity of description.

Referring now to FIGS. 1–4, there is shown an apparatus for dissolving and dispensing liquid dissolvable material such as a lawn fertilizing apparatus 10. The lawn fertilizing apparatus 10 includes a container or tank 12 and a body 14. As shown in FIGS. 2 and 4, the body 14 is removably secured to the tank 12. In particular, the body 14 includes a threaded inner surface 16 which threadingly engages an outer threaded surface 18 of the tank 12. It should be appreciated that a user may remove the body 14 from the tank 12 so as to pour a chemical such as a water soluble or dissolvable fertilizer through an access opening 20 so as to be mixed with water in a mixing chamber 22 defined in the tank 12. Preferably, the tank 12 is constructed of polyethylene, whereas the body 14 is constructed of polypropylene.

The body 14 has a fluid or water inlet 24, a sprinkler outlet 26, and a hose outlet 28 defined therein. The body 14 also has a central passage 30 defined therein which fluidly couples the water inlet 24, the sprinkler outlet 26, and the hose outlet 28 to one another. The body 14 also has a mixing inlet 32 and a mixing outlet 34 defined therein. The mixing inlet 32 and the mixing outlet 34 are provided so as to place the central passage 30 (and hence the water inlet 24, the sprinkler outlet 26, and the hose outlet 28) in fluid communication with the mixing chamber 22. The mixing outlet 34 has a filter 36 secured therein so as to prevent solid material such as undissolved fertilizer from being advanced from the mixing chamber 22 into the central passage 30 and the other components associated with the lawn fertilizing apparatus 10 (e.g. the sprinkler assembly or the outlet hose).

The water inlet 24 has an anti-siphon assembly 38 positioned therein. The anti-siphon assembly 38 is a one-way valve assembly that prevents fluid (i.e. water or a water/chemical mixture) from backflowing out the water inlet 24. It should be appreciated that such a feature is particularly useful for preventing the water/chemical mixture from backflowing out the water inlet 24 and into contact with the hands or body of the user during decoupling of the water inlet 24 from the water supply garden hose (not shown). Moreover, the location of the body 14 relative to the tank 12 also prevents such backflowing of the water/chemical mixture during decoupling of the water inlet 24 from the water supply garden hose (not shown). In particular, as shown in FIGS. 2 and 4, the body 14 is secured to an upper portion 40 of the tank 12. Hence, the central passage 30 is at all times (assuming the lawn fertilizing apparatus 10 is positioned upright) positioned at a location above the fluid level of the water/chemical mixture contained in the tank 12. Hence, decoupling of the water supply garden hose from the water inlet 24 does not cause the water/chemical mixture contained in the tank 12 to backflow out of the water inlet 24 as is the case with certain lawn fertilizing apparatuses which have heretofore been designed.

The central passage 30 has a flow restrictor 42 positioned therein. The flow restrictor 42 is positioned so as to restrict the flow of water advancing through the central passage 30. In particular, the flow restrictor 42 is positioned downstream of the water inlet 24, but upstream of the sprinkler outlet 26 and the hose outlet 28. Water supplied from a residential water source via a garden hose typically has a water pressure of approximately 80 pounds-per-square-inch (psi). The flow restrictor 42 is configured so as to cause a pressure drop on the downstream side thereof so as to cause the water exiting the sprinkler outlet 26 or the hose outlet 28 to have a water pressure of approximately 60 psi. Moreover, a pressure drop is created across the mixing inlet 32 so as to cause the fluid pressure of the water/chemical mixture contained in the tank 12 to be approximately the same as water pressure in the central passage downstream of the flow restrictor 42 (e.g. approximately 60 psi). It should be appreciated that the tank 12 may be constructed of lighter and/or thinner materials due to the decreased fluid pressure therein relative to lawn fertilizing apparatuses which provide for a residential water flow directly into the tank (i.e. at residential pressures). Although a particular pressure drop (i.e. from 80 psi to 60 psi) is herein exemplary described, it should be appreciated that the configuration of the flow restrictor 42 could be modified to create a pressure drop of a different magnitude in order to fit the needs of a give lawn fertilizing apparatus. Moreover, variation from the aforementioned exemplary pressure drop (i.e. from 80 psi to 60 psi) may also occur as the result of fluctuations in water pressure associated with the supply flow of water advancing into the fluid inlet 24. In particular, it is known that water pressure from residential or commercial water supply systems can vary from location to location. Such variation in the incoming water pressure can cause a pressure drop across the flow restrictor 42 which differs from the aforementioned exemplary pressure drop.

As shown in FIGS. 1 and 2, the lawn fertilizing apparatus 10 of the present invention may be equipped with a sprinkler assembly 44 so as to spray liquid fertilizer on a residential lawn or the like. The sprinkler assembly 44 includes a threaded end portion 48 which threadingly engages a threaded inner surface 50 of the sprinkler outlet 26. Moreover, in such a sprinkler configuration, a cap 52 is threadingly secured to the hose outlet 28 so as to prevent fluid (e.g. water or the water/chemical mixture) from advancing through the hose outlet 28. Hence, in such a sprinkler configuration, fluid in the central passage 30 (i.e. water advancing through the flow restrictor 42 and/or the water/chemical mixture advancing through the mixing outlet 34) is advanced out of the lawn fertilizing apparatus 10 via the sprinkler outlet 26 and hence through the sprinkler assembly 44. It should be appreciated that numerous known sprinkler assemblies may be utilized as the sprinkler assembly 44 of the present invention. One such commercially available sprinkler assembly which is particularly useful as the sprinkler assembly 44 of the present invention is a Pattern Master Sprinkler Assembly which is commercially available from Gilmour Manufacturing Company of Somerset, Pa.

In such a sprinkler configuration, the user initially places a chemical such as fertilizer in the tank 12 by unscrewing and thereafter removing the body 14 (and hence the sprinkler assembly 44) from the upper portion 40 of the tank 12. The user may then pour the fertilizer through the access opening 20 of the tank 12 such that the fertilizer is placed in the mixing chamber 22. The body 14 (and hence the sprinkler assembly 44) is then re-secured to the tank 12. A first end of a water supply line such as a garden hose (not shown) is then coupled to the water inlet 24 such that a supply flow of water is advanced through the water inlet 24 when a second end of the garden hose is coupled to a water source. Water advancing through the water inlet 24 is initially advanced into the mixing chamber 22 via both the mixing inlet 32 and the mixing outlet 34. It should be appreciated that as discussed above, the water present in the central passage 30 at locations upstream of the flow restrictor 42 and the mixing inlet 32 is at a pressure level equal to the water pressure provided by the water source (e.g. 80 psi for typical residential water sources). The flow of water into the mixing chamber 22 via the mixing inlet 32 and the mixing outlet 34 provides agitation which helps dissolve the fertilizer in the mixing chamber 22.

Once the mixing chamber 22 fills with a water/fertilizer mixture which has a fluid pressure equal to the water pressure in the central passage 30 downstream of the flow restrictor 42 (e.g. 60 psi), the water/fertilizer mixture in the mixing chamber 22 is advanced through the mixing outlet 34 (and hence the filter 36) where it mixes with water advancing through the flow restrictor 42 and is thereafter advanced through the sprinkler assembly 44 so as to be dispensed onto a residential lawn or the like. It should be appreciated that the fluid pressure in the mixing chamber 22 is maintained by the flow of water being directed through the mixing inlet 32. Moreover, the flow of water directed through the mixing inlet 32 agitates the water/fertilizer mixture in the mixing chamber so as to facilitate dissolving the fertilizer in water.

Alternatively, as shown in FIGS. 3 and 4, the lawn fertilizing apparatus 10 of the present invention may be coupled (without the sprinkler assembly 44) to an outlet garden hose 46 so as to provide for a flow of a water/chemical mixture to an external component such as an external oscillating sprinkler or an array of sprinklers (i.e. a number of sprinklers attached to the end of the garden hose 46). In such a feeder-only configuration, the sprinkler assembly 44 is removed, and a cap 54 is threadingly secured to the sprinkler outlet 26 so as to prevent fluid (e.g. water or the water/chemical mixture) from advancing through the sprinkler outlet 26. Moreover, the cap 52 (see FIGS. 1 and 2) is removed from the hose outlet 28 and thereafter the garden hose 46 is coupled to the hose outlet 28. Hence, in such a feeder-only configuration, fluid in the central passage 30 (i.e. water advancing through the flow restrictor 42 and/or the water/chemical mixture advancing through the mixing outlet 34) is advanced out of the lawn fertilizing apparatus 10 via the hose outlet 28 and hence through the garden hose 46 so as to supply a flow of a water/chemical mixture to an external sprinkler or the like.

Operation of the lawn fertilizing apparatus 10 in the feeder-only configuration of FIGS. 3 and 4 is somewhat similar to operation of the lawn fertilizing apparatus in the sprinkler configuration of FIGS. 1 and 2. In particular, in such a feeder-only configuration, the user initially places a chemical such as fertilizer in the tank 12 by unscrewing and thereafter removing the body 14 (and hence the outlet garden hose 46) from the upper portion 40 of the tank 12. The user may then pour the fertilizer through the access opening 20 of the tank 12 such that the fertilizer is placed in the mixing chamber 22. The body 14 (and hence the garden hose 46) is then re-secured to the tank 12. A first end of a water supply line such as a garden hose (not shown) is then coupled to the water inlet 24 such that a supply flow of water is advanced through the water inlet 24 when a second end of the garden hose is coupled to a water source. Water advancing through the water inlet 24 is initially advanced into the mixing chamber 22 via both the mixing inlet 32 and the mixing outlet 34. It should be appreciated that as discussed above, the water present in the central passage 30 at locations upstream of the flow restrictor 42 and the mixing inlet 32 is at pressure level equal to the water pressure provided by the water source (e.g. 80 psi for typical residential water sources). The flow of water into the mixing chamber 22 via the mixing inlet 32 and the mixing outlet 34 provides agitation which is helps dissolve the fertilizer in the mixing chamber 22.

Once the mixing chamber 22 fills with a water/fertilizer mixture which has a fluid pressure equal to the water pressure present in the central passage 30 downstream of the flow restrictor 42 (e.g. 60 psi), the water/fertilizer mixture in the mixing chamber 22 is advanced through the mixing outlet 34 (and hence the filter 36) where it mixes with water advancing through the flow restrictor 42 and is thereafter advanced through the hose outlet 28 and hence the garden hose 46 so as to be dispensed onto a residential lawn by an external sprinkler or the like. It should be appreciated that the fluid pressure in the mixing chamber 22 is maintained by the flow of water being directed through the mixing inlet 32. Moreover, the flow of water directed through the mixing inlet 32 agitates the water/fertilizer mixture in the mixing chamber so as to facilitate dissolving the fertilizer in water.

In operation, the lawn fertilizing apparatus 10 may be operated in its sprinkler configuration in which the sprinkler assembly 44 is secured in the sprinkler outlet 26 and the cap 52 is secured to the hose outlet 28. Thereafter, when the user places a chemical such as fertilizer in the tank 12 and couples the water inlet 24 to a water source via a garden hose as described above, the fertilizer in the mixing chamber 22 is dissolved in water and the resultant water/chemical mixture is thereafter sprayed onto a residential lawn or the like by the sprinkler assembly 44.

Alternatively, the fertilizing apparatus may be operated in its feeder-only configuration in which the sprinkler assembly 44 is removed and the cap 54 is secured to the sprinkler outlet 26 so as to prevent fluid from advancing therethrough. In addition, the cap 52 is removed such that the outlet garden hose 46 may be secured to the hose outlet 28. Thereafter, when the user places a chemical such as fertilizer in the tank 12 and couples the water inlet 24 to a water source via a supply garden hose as described above, the fertilizer in the mixing chamber 22 is dissolved in water and the resultant water/chemical mixture is thereafter advanced to an external sprinkler or the like via the outlet garden hose 46.

Hence, as described herein, the lawn fertilizing apparatus 10 of the present invention has numerous advantages over lawn fertilizing apparatuses which have heretofore been designed. For example, the lawn fertilizing apparatus 10 of the present invention includes two water outlets (i.e. the sprinkler outlet 26 and the hose outlet 28) so as to allow the lawn fertilizing apparatus 10 to be selectively configured in a sprinkler configuration (see FIGS. 1 and 2) or a feeder-only configuration (see FIGS. 3 and 4) thereby enhancing the flexibility of the lawn sprinkler apparatus 10. Moreover, the location of the water inlet 24 (i.e. above the fluid level in the tank 12) prevents any water/chemical mixture remaining the tank 12 from backflowing out of the water inlet 24 if the water supply hose is removed from the water inlet 24. Yet further, manufacturing costs associated with the lawn fertilizing apparatus 10 are lowered by molding the water inlet 24, the sprinkler outlet 26, and the hose outlet 28 in the body 14 instead of the tank 12 as is the case with certain heretofore designed lawn fertilizing apparatuses. Moreover, by use of the filter 36, the lawn fertilizing apparatus 10 of the present invention is less susceptible to clogging of the sprinkler assembly 44 (or an external sprinkler) relative to lawn fertilizing apparatuses which have heretofore been designed.

While the invention has been illustrated and described in detail in the drawings and foregoing description, such an illustration and description is to be considered as exemplary and not restrictive in character, it being understood that only the preferred embodiment has been shown and described and that all changes and modifications that come within the spirit of the invention are desired to be protected.

For example, while the body 14 is herein described as being threadingly engaged to the container 12, and has significant advantages thereby in the present invention, certain of such advantages may be achieved by removably securing the body 14 to the container 12 in other manners. For example, a complimentary pair of snap fit couplings may be utilized to removably secure the body 14 to the container 12. In particular, a first snap fit coupling such as a molded protrusion or the like may be defined in the container 12, with a complimentary snap fit coupling such as a recess for receiving the protrusion defined in the body 14. Moreover, a number of locking couplings such as locking tabs or the like may be utilized to removably secure the body 14 to the container 12. For example, the body 14 may be configured to have a number of tabs protruding therefrom, with the container 12 having a corresponding number of flexible clamps secured thereto for engaging the tabs protruding from the body 14.

There are a plurality of advantages of the present invention arising from the various features of the lawn fertilizing apparatus described herein. It will be noted that alternative embodiments of the lawn fertilizing apparatus of the present invention may not include all of the features described yet still benefit from at least some of the advantages of such features. Those of ordinary skill in the art may readily devise their own implementations of the lawn fertilizing apparatus that incorporate one or more of the features of the present invention and fall within the spirit and scope of the present invention as defined by the appended claims.

What is claimed is:

1. An apparatus for dissolving and dispensing liquid dissolvable material, comprising:

a container having a mixing chamber defined therein; and a body removably secured to said container, wherein (i) said body has (a) a fluid inlet, (b) a first fluid outlet, (c) a second fluid outlet, and (d) a central passage defined therein, (ii) said central passage being in fluid communication with each of said fluid inlet, said first fluid outlet, and said second fluid outlet, and (iii) said central passage also being in fluid communication with said mixing chamber such that each of said fluid inlet, said first fluid outlet, and said second fluid outlet is in fluid communication with said mixing chamber.

2. The apparatus of claim 1, wherein:

said body further has a mixing inlet defined therein, said mixing inlet places said central passage in fluid communication with said mixing chamber, and fluid is advanced into said mixing chamber via a first fluid path which includes said fluid inlet, said central passage, and said mixing inlet.

3. The apparatus of claim 2, wherein:

said body further has a mixing outlet defined therein, said mixing outlet places said mixing chamber in fluid communication with said central passage, and fluid is advanced from said mixing chamber via a second fluid path which includes said mixing outlet, said central passage, and either said first fluid outlet or said second fluid outlet.

4. The apparatus of claim 1, further comprising a filter positioned between said mixing chamber and said mixing outlet, wherein said filter prevents solid material from being advanced from said mixing chamber into said central passage of said body.

5. The apparatus of claim 1, further comprising a sprinkler assembly and a first cap, wherein:

said first cap is securable to said first fluid outlet of said body so as to prevent fluid from advancing through said first fluid outlet, said sprinkler assembly is securable to said second fluid outlet of said body so as to allow fluid to be advanced through said second fluid outlet, and fluid is advanced from said mixing chamber via a first fluid path which includes said mixing outlet, said central passage, said second fluid outlet, and said sprinkler assembly when (i) said first cap is secured to said first outlet of said body, and (ii) said sprinkler assembly is secured to said second outlet of said body.

6. The apparatus of claim 5, further comprising an outlet hose and a second cap, wherein:

said second cap is securable to said second fluid outlet of said body so as to prevent fluid from advancing through said second fluid outlet, said outlet hose is securable to said first fluid outlet of said body so as to allow fluid to be advanced through said first fluid outlet, and fluid is advanced from said mixing chamber via a second fluid path which includes said mixing outlet, said central passage, said first fluid outlet, and said outlet hose when (i) said second cap is secured to said second outlet of said body, and (ii) said outlet hose is secured to said first outlet of said body.

7. The apparatus of claim 1, wherein said body is secured to an upper portion of said container such that said central passage of said body is positioned above a fluid level in said container when said container has fluid present therein.

8. The apparatus of claim 1, further comprising a flow restrictor, wherein:

said flow restrictor is positioned in said central passage at a location which is (i) downstream of said fluid inlet, and (ii) upstream of both said first fluid outlet and said second fluid outlet, fluid upstream of said flow restrictor possesses a first fluid pressure level, fluid downstream of said flow restrictor possesses a second fluid pressure level which is less than said first fluid pressure level, and fluid within said mixing chamber possesses said second fluid pressure level.

9. The apparatus of claim 1, wherein said body is threadingly engaged with an upper portion of said container so as to secure said body to said container.

10. The apparatus of claim 1, wherein:

said container has a first coupling, and said body has a second coupling which cooperates with said first coupling so as to secure said body to said container.

11. The apparatus of claim 10, wherein:

said first coupling includes a first threaded portion, said second coupling includes a second threaded portion, and said first threaded portion cooperates with said second threaded portion so as to secure said body to said container.

12. An apparatus for dissolving and dispensing liquid dissolvable material, comprising:

a container having a mixing chamber defined therein;

a body removably secured to an upper portion of said container, wherein (i) said body has (a) a fluid inlet, (b) a first fluid outlet, (c) a second fluid outlet, and (d) a central passage defined therein, (ii) said central passage being in fluid communication with each of said fluid inlet, said first fluid outlet, and said second fluid outlet, and (iii) said central passage also being in fluid communication with said mixing chamber such that each of said fluid inlet, said first fluid outlet, and said second fluid outlet is in fluid communication with said mixing chamber;

a cap secured to said first fluid outlet of said body so as to prevent fluid from advancing through said first fluid outlet; and a sprinkler assembly secured to said second fluid outlet of said body, wherein (i) fluid is advanced from said mixing chamber via a first fluid path which includes said central passage, said second fluid outlet, and said sprinkler assembly.

13. The apparatus of claim 12, further comprising a filter positioned between said mixing chamber and said mixing outlet, wherein said filter prevents solid material from being advanced from said mixing chamber into said central passage of said body.

14. The apparatus of claim 12, wherein said body is secured to said upper portion of said container such that said central passage of said body is positioned above a fluid level in said container when said container has fluid present therein.

15. The apparatus of claim 12, further comprising a flow restrictor, wherein:

said flow restrictor is positioned in said central passage at a location which is (i) downstream of said fluid inlet, and (ii) upstream of both said first fluid outlet and said second fluid outlet, fluid upstream of said flow restrictor possesses a first fluid pressure level, fluid downstream of said flow restrictor possesses a second fluid pressure level which is less than said first fluid pressure level, and fluid within said mixing chamber possesses said second fluid pressure level.

16. The apparatus of claim 12, wherein:

said body further has a mixing inlet defined therein, said mixing inlet places said central passage in fluid communication with said mixing chamber, and fluid is advanced into said mixing chamber via a second fluid path which includes said fluid inlet, said central passage, and said mixing inlet.

17. The apparatus of claim 16, wherein:

said body further has a mixing outlet defined therein, said mixing outlet places said mixing chamber in fluid communication with said central passage, and fluid is advanced from said mixing chamber via a third fluid path which includes said mixing outlet, said central passage, and either said first fluid outlet or said second fluid outlet.

18. An apparatus for dissolving and dispensing liquid dissolvable material, comprising:

a container having a mixing chamber defined therein;

a body removably secured to an upper portion of said container, wherein (i) said body has (a) a fluid inlet, (b) a first fluid outlet, (c) a second fluid outlet, and (d) a central passage defined therein, (ii) said central passage being in fluid communication with each of said fluid inlet, said first fluid outlet, and said second fluid outlet, and (iii) said central passage also being in fluid communication with said mixing chamber such that each of said fluid inlet, said first fluid outlet, and said second fluid outlet is in fluid communication with said mixing chamber;

a cap secured to said second fluid outlet of said body so as to prevent fluid from advancing through said second fluid outlet; and an outlet hose secured to said first fluid outlet of said body, wherein fluid is advanced from said mixing chamber via a first fluid path which includes said central passage, said first fluid outlet, and said outlet hose.

19. The apparatus of claim 18, further comprising a filter positioned between said mixing chamber and said mixing outlet, wherein said filter prevents solid material from being advanced from said mixing chamber into said central passage of said body.

20. The apparatus of claim 18, wherein said body is secured to said upper portion of said container such that said central passage of said body is positioned above a fluid level in said container when said container has fluid present therein.

21. The apparatus of claim 18, further comprising a flow restrictor, wherein:

said flow restrictor is positioned in said central passage at a location which is (i) downstream of said fluid inlet, and (ii) upstream of both said first fluid outlet and said second fluid outlet, fluid upstream of said flow restrictor possesses a first fluid pressure level, fluid downstream of said flow restrictor possesses a second fluid pressure level which is less than said first fluid pressure level, and fluid within said mixing chamber possesses said second fluid pressure level.

22. The apparatus of claim 18, wherein:

said body further has a mixing inlet defined therein, said mixing inlet places said central passage in fluid communication with said mixing chamber, and fluid is advanced into said mixing chamber via a second fluid path which includes said fluid inlet, said central passage, and said mixing inlet.

23. The apparatus of claim 22, wherein:

said body further has a mixing outlet defined therein, said mixing outlet places said mixing chamber in fluid communication with said central passage, and fluid is advanced from said mixing chamber via a third fluid path which includes said mixing outlet, said central passage, and either said first fluid outlet or said second fluid outlet.

24. A fertilizer dispensing mechanism, comprising:

a fertilizer container having (i) a chamber defined therein, and (ii) a first coupling; and a fluid directing body having a second coupling which cooperates with said first coupling so as to secure said fluid directing body to said fertilizer container, said body having a fluid inlet, a sprinkler fluid outlet, and a hose fluid outlet defined therein, wherein said fertilizer dispensing mechanism is operable in a sprinkler supply mode and a hose supply mode, wherein when said fertilizer dispensing mechanism is operating in said sprinkler supply mode, fluid entering said fluid inlet of said fluid directing body is directed (i) from said fluid inlet to said chamber of said fertilizer container, and then (ii) from said chamber to said sprinkler fluid outlet of said fluid directing body, and then (iii) out of said fluid directing body through said sprinkler fluid outlet, and wherein when said fertilizer dispensing mechanism is operating in said hose supply mode, fluid entering said fluid inlet of said fluid directing body is directed (i) from said fluid inlet to said chamber of said fertilizer container, and then (ii) from said chamber to said hose fluid outlet of said fluid directing body, and then (iii) out of said fluid directing body through said hose fluid outlet.

25. The fertilizer dispensing mechanism of claim 24, further comprising a filter positioned to inhibit solid material from advancing (i) from said chamber of said fertilizer container to said sprinkler fluid outlet of said fluid directing body when said fertilizer dispensing mechanism is operating in said sprinkler supply mode, and (ii) from said chamber of said fertilizer container to said hose fluid outlet of said fluid directing body when said fertilizer dispensing mechanism is operating in said hose supply mode.

26. The fertilizer dispensing mechanism of claim 24, further comprising:

a first cap which is secured over said hose fluid outlet when said fertilizer dispensing mechanism is operating in said sprinkler supply mode; and a second cap which is secured over said sprinkler fluid outlet when said fertilizer dispensing mechanism is operating in said hose supply mode.

27. The fertilizer dispensing mechanism of claim 24, wherein:

said first coupling includes a first threaded portion, said second coupling includes a second threaded portion, and said first threaded portion cooperates with said second threaded portion so as to secure said fluid directing body to said fertilizer container.

* * * * *